United States Patent
Benway et al.

(10) Patent No.: US 10,152,959 B2
(45) Date of Patent: Dec. 11, 2018

(54) LOCALITY BASED NOISE MASKING

(71) Applicant: Plantronics, Inc., Santa Cruz, CA (US)

(72) Inventors: Evan Harris Benway, Santa Cruz, CA (US); Darrin Caddes, Soquel, CA (US); Jeffrey Michael Larson, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/365,647

(22) Filed: Nov. 30, 2016

(65) Prior Publication Data
US 2018/0151168 A1    May 31, 2018

(51) Int. Cl.
*G10K 11/175*    (2006.01)
*H04R 3/12*    (2006.01)
*G06F 3/0484*    (2013.01)

(52) U.S. Cl.
CPC .......... *G10K 11/175* (2013.01); *G06F 3/0484* (2013.01); *H04R 3/12* (2013.01)

(58) Field of Classification Search
CPC ...... H04M 9/082; H04M 9/08; H04R 1/1083; H04R 2227/009; H04R 2430/01; H04R 5/033; H04R 5/04; H04R 2460/01; H03G 3/32; H03G 3/24; H03G 9/005; H03G 9/025; G10K 11/175; G10K 2210/1081; G10K 11/17
See application file for complete search history.

(56) References Cited

U.S. PATENT DOCUMENTS

| | | | |
|---|---|---|---|
| 9,674,154 B1* | 6/2017 | Canavor | H04L 63/0407 |
| 2003/0030733 A1* | 2/2003 | Seaman | G06F 17/30017 348/239 |
| 2003/0078515 A1* | 4/2003 | Menzel | A61B 5/0002 600/559 |
| 2003/0107478 A1 | 6/2003 | Hendricks et al. | |
| 2003/0144847 A1* | 7/2003 | Roy | H04R 27/00 704/278 |
| 2003/0144848 A1* | 7/2003 | Roy | H04R 27/00 704/500 |
| 2006/0147185 A1* | 7/2006 | Erickson | H04N 5/76 386/210 |
| 2007/0097214 A1* | 5/2007 | Jung | H04N 5/76 348/207.1 |

(Continued)

OTHER PUBLICATIONS

Benway et al., "Biometric-Based Dynamic Sound Masking," Unpublished Utility U.S. Appl. No. 14/833,386, filed Aug. 24, 2015 and Filing Receipt, 23 pages.

(Continued)

*Primary Examiner* — Mohammad Islam
(74) *Attorney, Agent, or Firm* — Chuang Intellectual Property Law

(57) ABSTRACT

Methods and apparatuses for noise masking are described. In one example, a location data is received or identified at a noise masking system, the noise masking system including a plurality of selectable noise masking sound audio files and a plurality of selectable video files. A noise masking sound audio file is selected from the plurality of selectable noise masking sound audio files and a video file is selected from the plurality of selectable video files utilizing the location data. The noise masking sound audio file is output to a loudspeaker and the video file is output to a video display device.

26 Claims, 10 Drawing Sheets

(56) References Cited

U.S. PATENT DOCUMENTS

| | | | |
|---|---|---|---|
| 2007/0120980 A1* | 5/2007 | Jung | G08B 13/19667 |
| | | | 348/207.1 |
| 2009/0175484 A1 | 7/2009 | Saint Vincent et al. | |
| 2009/0306798 A1 | 12/2009 | Moeller et al. | |
| 2011/0002477 A1 | 1/2011 | Zickmantel | |
| 2011/0188666 A1 | 8/2011 | Mason et al. | |
| 2012/0283593 A1* | 11/2012 | Searchfield | H04R 25/75 |
| | | | 600/559 |
| 2013/0170662 A1* | 7/2013 | Koga | G10K 11/175 |
| | | | 381/73.1 |
| 2013/0243215 A1 | 9/2013 | Moeller et al. | |
| 2015/0070582 A1* | 3/2015 | Jung | H04N 7/0117 |
| | | | 348/441 |
| 2015/0181332 A1* | 6/2015 | Benway | H04R 3/002 |
| | | | 381/73.1 |
| 2015/0243297 A1 | 8/2015 | Benway et al. | |
| 2015/0287421 A1* | 10/2015 | Benway | H04K 3/43 |
| | | | 704/226 |
| 2015/0348530 A1* | 12/2015 | Findlay | G10K 11/1786 |
| | | | 381/309 |
| 2015/0350780 A1 | 12/2015 | Horrall et al. | |
| 2016/0027019 A1* | 1/2016 | Michaelangelo | G06Q 30/016 |
| | | | 705/7.26 |
| 2016/0142820 A1* | 5/2016 | Kraft | H04R 1/1083 |
| | | | 381/94.3 |
| 2016/0182940 A1* | 6/2016 | Assayag | H04N 21/4312 |
| | | | 725/62 |
| 2016/0277834 A1* | 9/2016 | Hata | H04R 3/04 |
| 2017/0026719 A1* | 1/2017 | Zhiwen | H04N 21/8547 |
| 2017/0076708 A1* | 3/2017 | Benway | G10K 11/175 |
| 2017/0132495 A1* | 5/2017 | Feris | G06K 9/6269 |
| 2017/0269901 A1* | 9/2017 | Klimanis | G06F 3/165 |
| 2017/0276764 A1* | 9/2017 | Vilermo | H04W 88/02 |

OTHER PUBLICATIONS

Benway et al., "Steerable Loudspeaker System for Individualized Sound Masking," Unpublished Utility U.S. Appl. No. 14/851,774, filed Sep. 11, 2015 and Filing Receipt, 22 pages.

* cited by examiner

LOCALITY BASED NOISE MASKING

BACKGROUND OF THE INVENTION

Noise within an open space is problematic for people working within the open space. For example, many office buildings utilize a large open office area in which many employees work in cubicles with low cubicle walls or at workstations without any acoustical barriers. Open space noise, and in particular speech noise, is the top complaint of office workers about their offices. One reason for this is that speech enters readily into the brain's working memory and is therefore highly distracting. Even speech at very low levels can be highly distracting when ambient noise levels are low (as in the case of someone answering a telephone call in a library). Productivity losses due to speech noise have been shown in peer-reviewed laboratory studies to be as high as 41%. Office acoustic design has gotten very good at reducing ambient noise, but the quiet environments that have been created can cause speech noise to contrast strongly with the quiet. Even quiet offices, therefore, can create a level of speech intelligibility that is highly distracting. The intelligibility of speech can be measured using the Speech Transmission Index (STI).

Another major issue with open offices relates to speech privacy. Workers in open offices often feel that their telephone calls or in-person conversations can be overheard. Speech privacy correlates directly to intelligibility. Lack of speech privacy creates measurable increases in stress and dissatisfaction and is one of the top complaints of workers about their office environments.

Open office noise is typically described by workers as unpleasant and uncomfortable. Speech noise, printer noise, telephone ringer noise, and other distracting sounds increase discomfort. All of these can be summarized to three acoustic problems: (1) excessive and distracting levels of speech intelligibility, (2) lack of speech privacy, and (3) lack of acoustical comfort. All three of these problems are becoming increasingly important as office densification accelerates. The higher the utilization of office space, the more acoustical problems come to the fore. This discomfort can be measured using subjective questionnaires as well as objective measures, such as cortisol levels.

In one type of prior art, the issues associated with office noise have been attacked by facilities professionals. Noise absorbing ceiling tiles, carpeting, screens, furniture, and so on, have become the standard and office noise has been substantially decreased. Reducing the noise levels does not, however, directly solve the three problems outlined above, as they relate to the intelligibility of speech. Speech intelligibility can be unaffected, or even increased, by the noise reduction measures of facilities professionals. Another type of prior art is injecting a pink noise or filtered pink noise (herein referred to simply as "pink noise") into the open office. Pink noise is effective in reducing speech intelligibility, increasing speech privacy, and increasing acoustical comfort. However, when used alone, listeners complain that pink noise sounds like an airplane environment, or complain that the constant air conditioning like sound of the pink noise becomes fatiguing over time.

As a result, improved methods and apparatuses for addressing open space noise are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
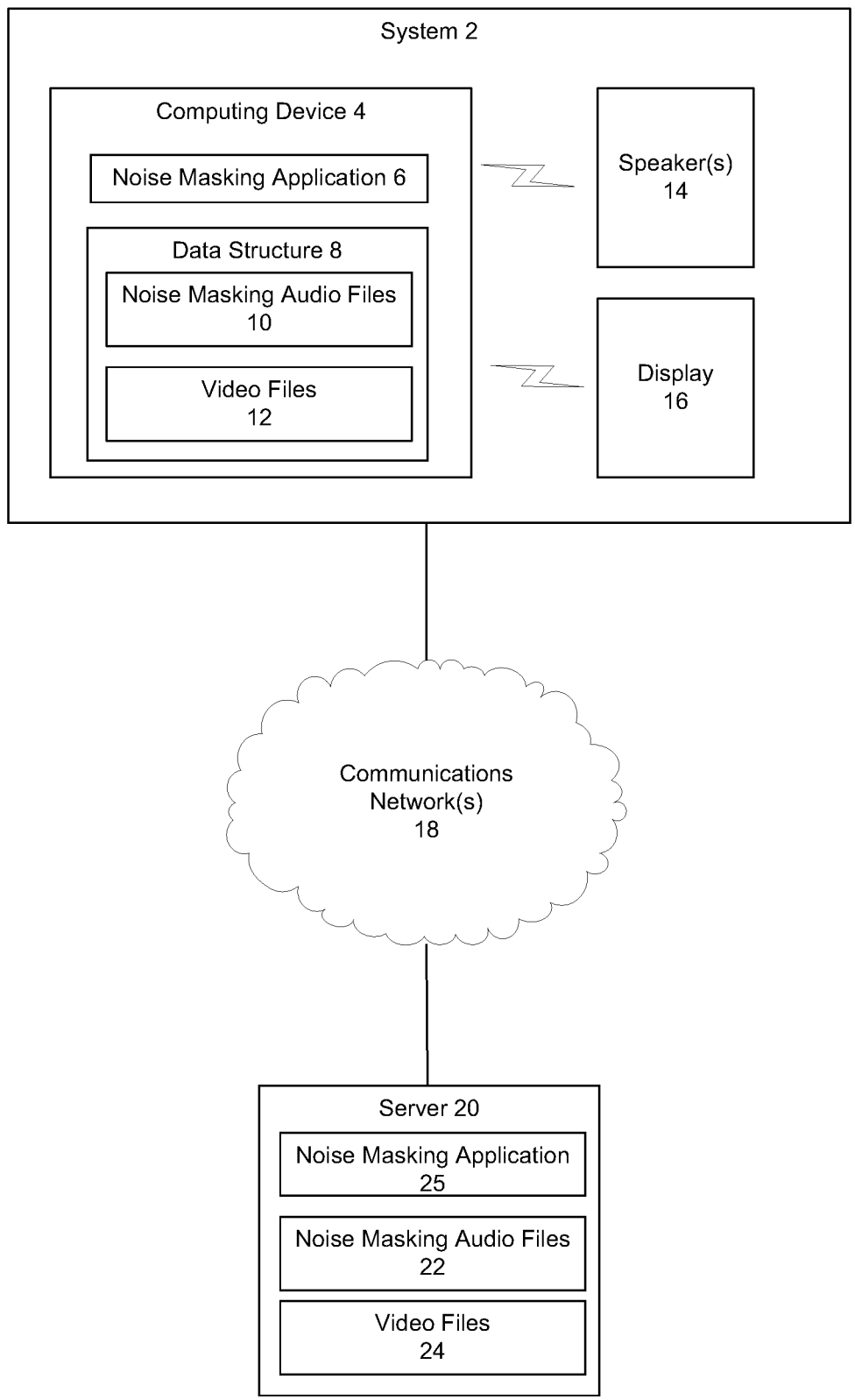
FIG. 1 illustrates a system for noise masking in one example.

Methods and apparatuses for noise masking are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example, a method includes receiving or identifying a location data at a noise masking system (also referred to by the inventors as a soundscaping system), the noise masking system including a plurality of selectable noise masking sound audio files and a plurality of selectable video files. The method includes selecting a noise masking sound audio file from the plurality of selectable noise masking sound audio files and a video file from the plurality of selectable video files utilizing the location data. The method further includes outputting the noise masking sound audio file to a loudspeaker and outputting the video file to a video display device.

In one example, one or more non-transitory computer-readable storage media having computer-executable instructions stored thereon which, when executed by one or more computers, cause the one more computers to perform operations including receiving or identifying a location data. The operations include selecting a noise masking sound audio file from a plurality of selectable noise masking sound audio files and a video file from a plurality of selectable video files utilizing the location data, wherein the plurality of selectable noise masking sound audio files and the plurality of selectable video files are correlated to a plurality of locations in a data structure. The operations further include outputting the noise masking sound audio file to a loudspeaker and outputting the video file to a video display device.

In one example, a system for masking open space noise includes a speaker arranged to output a speaker sound in an open space, a display device disposed in the open space, a processor, and a memory. The memory stores a plurality of selectable noise masking sound audio files and the plurality of selectable video files are correlated to a plurality of locations. The memory further stores an application program having computer-executable instructions configured to select a noise masking sound audio file from a plurality of selectable noise masking sound audio files and a video file from a plurality of selectable video files utilizing a current location data, and output the noise masking sound audio file at the speaker and output the video file at the display device.

In one example, a method includes receiving or identifying a location data at a noise masking system, the noise masking system including a plurality of selectable noise masking files. The method includes selecting a noise masking file from the plurality of selectable noise masking files utilizing the location data, and outputting the noise masking file with the noise masking system.

In one example, a method includes receiving or identifying a location data at a building management system, the building management system includes a plurality of selectable media files. The method includes selecting a media file from the plurality of selectable media files utilizing the location data, and outputting the media file in a building environment. In one example, the building management system includes a noise masking system. In one example, the media file selected includes an audio data and a video data. In one example, the media file selected includes a noise masking sound.

In one example, a noise masking installation utilizes its present location to configure its output of audio and video. The location of the noise masking installation can be determined in a number of ways, including an IP address lookup or simple manual input by an installer at the time of installation and commissioning. The noise masking system's audio and visual components are then adjusted based on the location. This can include utilizing local weather information so that, for example, when it rains outside, the system plays a rain soundscape and an accompanying rain visual, or the converse, so that offices in high rain volume locations are played above-average amounts of beach sound/visualscapes. Advantageously, user experience with the noise masking system is greatly enhanced. By matching audio and video to the current location, the users' overall psychological comfort with the noise masking system is increased, thereby allowing the noise masking sounds to be output at a higher level to mask higher levels of open space noise.

The location information can also be used to tailor soundscapes based on local geography. In this scenario, we can create appropriate sound and visualscapes for various geographic areas, and systems determined to be within particular regions are played the appropriate sound/visualscapes. Examples of regionally appropriate sounds and visuals are various species of birds or intensity of rainfall. Time can also be applied to this system, so that regional sound and visualscapes are made to fit with the time of year (e.g., babbling brooks in Santa Cruz, Calif. in the winter or spring) or the time of day (e.g. birdsong is appropriate in the morning but tapered off by the afternoon so as not to be annoying).

Users may have varying preferences for the natural soundscapes and visualscapes that accompany them. This may vary based on geography, weather, and time of day. In one example, users also have the option to choose their own soundscapes and associated visuals. Their choice and usage can then be reported to the noise masking system via the cloud. The noise masking system analyzes regional usage to understand how preferences for soundscapes and visuals vary by region, in order to develop regionally appropriate experiences.

FIG. 1 illustrates a system 2 for noise masking in one example. The noise masking may include, for example, outputting sounds for masking open space noise. Noise masking (also referred to as "sound masking") is the introduction of sound or constant background noise in a space in order to reduce speech intelligibility, increase speech privacy, and increase acoustical comfort. For example, the introduced sound may be a nature associated sound, such as flowing water or birdsong. For example, a pink noise, filtered pink noise, brown noise, or other similar random noise (herein referred to simply as "pink noise") may be injected into the open office. Pink noise is effective in reducing speech intelligibility, increasing speech privacy, and increasing acoustical comfort.

System 2 includes a computing device 4, loudspeaker(s) 14 arranged to output a speaker sound in an open space, and video display 16 disposed in the open space. Computing device 4 may for example be a laptop, tablet computer, desktop personal computer, server, or smartphone. Computing device 4 stores a plurality of selectable noise masking sound audio files 10 and a plurality of selectable video files 12 correlated to a plurality of locations. Computing device 4 further stores a noise masking application 6 configured to select a noise masking sound audio file from a plurality of selectable noise masking sound audio files 10 and a video file from a plurality of selectable video files 12 utilizing a current location data. Noise masking application 6 includes or interfaces with a digital audio player and a digital video player at computing device 4. Noise masking application 6 outputs (i.e., plays) the selected noise masking sound audio file at loudspeaker(s) 14 and outputs (i.e., plays) the selected video file at video display 16. Although only a single video display 16 is shown, multiple displays may be utilized to output the selected video file. In one example, the current location data includes an Internet Protocol address. In one example, the current location data includes a city, state, or region data.

For example, loudspeaker(s) 14 may be disposed in a plenum above an open space and arranged to direct the speaker sound in a direction opposite the open space. In one example, loudspeaker(s) 14 are a plurality of speakers disposed at varying distances from the video display 16. An output level of the speaker sound from a speaker may be adjusted based on the distance of the speaker from the video display 16. In one example, video display 16 may be visible from any location within the open space.

In one example, a server 20 is capable of communications with computing device 4 via one or more communication network(s) 18. For example, communication network(s) 18 may include an Internet Protocol (IP) network, cellular communications network, public switched telephone network, IEEE 802.11 wireless network, Bluetooth network, or any combination thereof.

Computing device 4 is capable of communication with server 20 via communication network(s) 18 utilizing wired or wireless network connections. For example, computing device 4 includes a wireless transceiver to connect to an IP network via a wireless Access Point utilizing an IEEE 802.11 communications protocol. In one example, the network connections are wireless cellular communications links.

Server 20 includes a noise masking application 25 and stores noise masking audio files 22 and video files 24. In one example, the noise masking application 25 is configured to transmit one or more of noise masking audio files 22 and video files 24 to computing device 4 upon request by noise masking application 6 at computing device 4. In one example, noise masking audio files 22 and video files 24 are stored in data structure 8. In a further example, noise masking audio files 22 and video files 24 are streamed to noise masking application 6 for direct output to loudspeaker(s) 14 and display(s), respectively.

Figure 2:
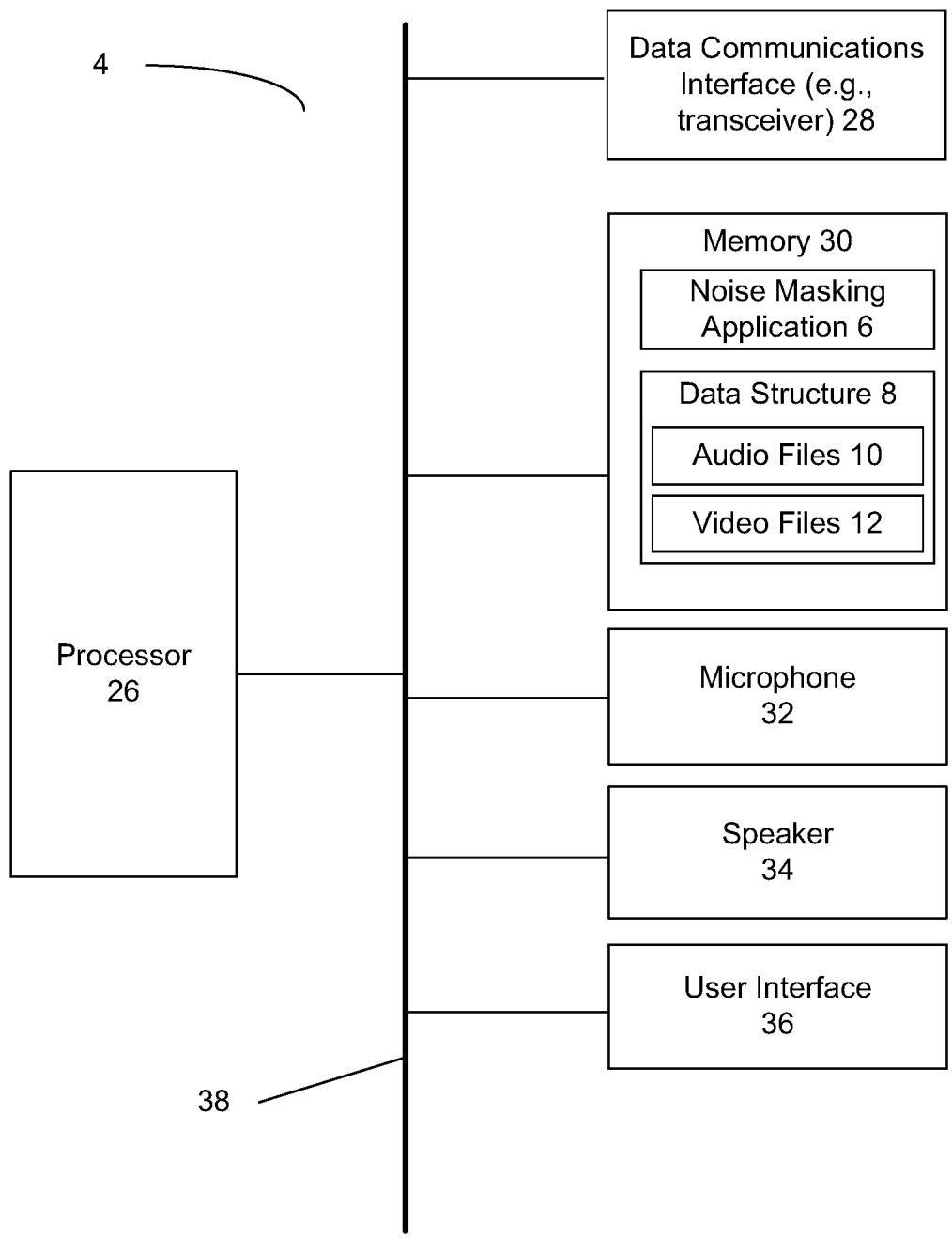
FIG. 2 illustrates a simplified block diagram of the computing device shown in FIG. 1 capable of performing noise masking.

FIG. 2 illustrates a simplified block diagram of the computing device 4 shown in FIG. 1 capable of performing noise masking and outputting selected associated visuals. The computing device 4 includes a processor 26 operably coupled via an interconnect 38 to a data communications interface 28, memory 30, a microphone 32, a speaker 34, and a user interface 36. In one example, data communications interface 28 is a wireless communications transceiver (e.g., utilizing IEEE 802.11 communications) operable to receive or identify location data from communication network(s) 18.

Memory 30 stores a data structure 8 (e.g., a database, table, or any other file/memory structure) for storing noise masking data, including noise masking audio files 10 and video files 12. Memory also stores noise masking application 6 configured and operating as described herein. Memory 30 may include a variety of memories, and in one example includes SDRAM, ROM, flash memory, or a combination thereof. Memory 30 may further include separate memory structures or a single integrated memory structure. In one example, memory 30 may be used to store passwords, network and telecommunications programs, and/or an operating system (OS).

Processor 26, using executable code and applications stored in memory, performs the necessary functions associated with managing the soundscape and associated visuals within an environment such as a building open space as described herein. In one example, processor 26 further interacts with server 20 to receive noise masking audio files 22 and video files 24. In one example, processor 26 is a high performance, highly integrated, and highly flexible system-on-chip (SoC), including signal processing functionality. Processor 26 may include a variety of processors (e.g., digital signal processors), with conventional CPUs being applicable. User interface 36 allows for manual communication between the system user (e.g., a system administrator) and the computing device, and in one example includes an interface allowing the system user to manually input a current location of the building in which the system 2 is being used.

In one example operation, a location data is received or identified at computing device 4 (e.g., the noise masking system). In one example, the location data is an Internet Protocol address and the user location is determined from the Internet Protocol address. In one example, the location data includes a city, state, or region data. Computing device 4 may, for example, receive or identify its geo-location utilizing an IP address, Wi-Fi connection data, or Global Positioning System (GPS) data.

Figure 3:
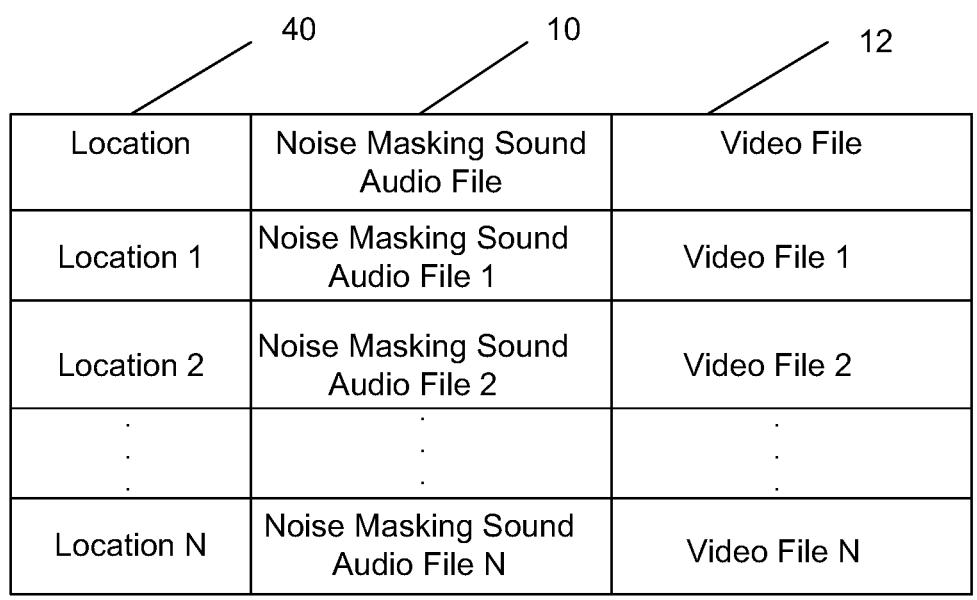
FIG. 3 is a simplified illustration of the contents of a data structure at the computing device shown in FIG. 2 storing noise masking audio files and video files.

A noise masking sound audio file is selected from the plurality of selectable noise masking sound audio files 10 and a video file from the plurality of selectable video files 12 utilizing the location data. The selected noise masking sound audio file is output to a loudspeaker 14 and the selected video file is output to a video display 16. In one example, the plurality of selectable noise masking sound audio files 10 and the plurality of selectable video files 12 are correlated to a plurality of locations in data structure 8, as illustrated in FIG. 3 in one example.

In one example, a current weather condition is identified utilizing the location data (e.g., from the Internet using communication network(s) 18), where selecting the noise masking sound audio file from the plurality of selectable noise masking sound audio files 10 and the video file from the plurality of selectable video files 12 includes utilizing the current weather condition. In one example, a current time of day is identified (e.g., utilizing the computing device 4 operating system), where selecting the noise masking sound audio file from the plurality of selectable noise masking sound audio files 10 and the video file from the plurality of selectable video files 12 includes utilizing the current time. In one example, a current date is identified, where selecting the noise masking sound audio file from the plurality of selectable noise masking sound audio files 10 and the video file from the plurality of selectable video files 12 includes utilizing the current date. For example, the current date is used to determine the current season.

In one example, a current weather condition is identified utilizing a local monitoring device, where selecting the noise masking sound audio file from the plurality of selectable noise masking sound audio files 10 and the video file from the plurality of selectable video files 12 includes utilizing the current weather condition determined from the local monitoring device. For example, the local monitoring device is one or more sensors providing data, including data not available from an internet based reporting service. In one example, the sensor is an ambient light sensor whose output is utilized by system 2 to react to varying degrees of cloud cover. The sensor may be co-located with computing device 4 or may transmit sensor output data via a wireless link to system 2.

In one example, the noise masking sound audio file includes a nature associated sound and the video file includes a nature associated visual. For example: (1) the nature associated sound includes a water sound and the nature associated visual includes a water visual, (2) the nature associated sound includes a beach sound and the nature associated visual includes a beach visual, or (3) the nature associated sound includes a forest sound and the nature associated visual includes a forest visual. In one example, the video file selected and the noise masking sound audio file selected are associated (e.g., selecting a particular noise masking sound audio file automatically selects a particular video file and vice versa) at the noise masking system.

FIG. 3 is a simplified illustration of the contents of a data structure 8 at the computing device shown in FIG. 2 storing noise masking audio files 10 and video files 12. For each received or identified location 40, data structure 8 includes one or more corresponding (i.e., associated) noise masking audio files 10 and video files 12. For example, the noise masking audio file may be an .mp3 or .wma audio file format and the video file 12 may be an .flv, .avi., .mpg, or .wmv file format. Upon receiving or identifying the current location of the computing device 4, computing device 4 selects from the one or more audio files 10 and video files 12 corresponding to the current location.

In one example, the noise masking audio files 10 include files of different nature sounds or random noise sounds. For example, the noise masking audio files 10 may include sound files for rainfall, waterfalls, ocean waves breaking on a beach, or birds chirping in a rainforest. These files may be recordings from nature or artificially generated (i.e., electronically synthesized). Noise masking audio files 10 may include sound files for pink noise or other random noise. In one example, a single noise masking audio file may include both a nature sound and a random noise mixed together. In a further example, two noise masking audio files 10 may be selected and mixed together for simultaneous output at loudspeaker 14. For each noise masking audio file, a corresponding video file 12 may be assigned/designated. For example, for a rainfall audio file, a video file of rain falling in a forest may be assigned. Similarly, for an audio file of ocean waves breaking on a beach, a video file of a beach with waves breaking is assigned.

Figure 4:
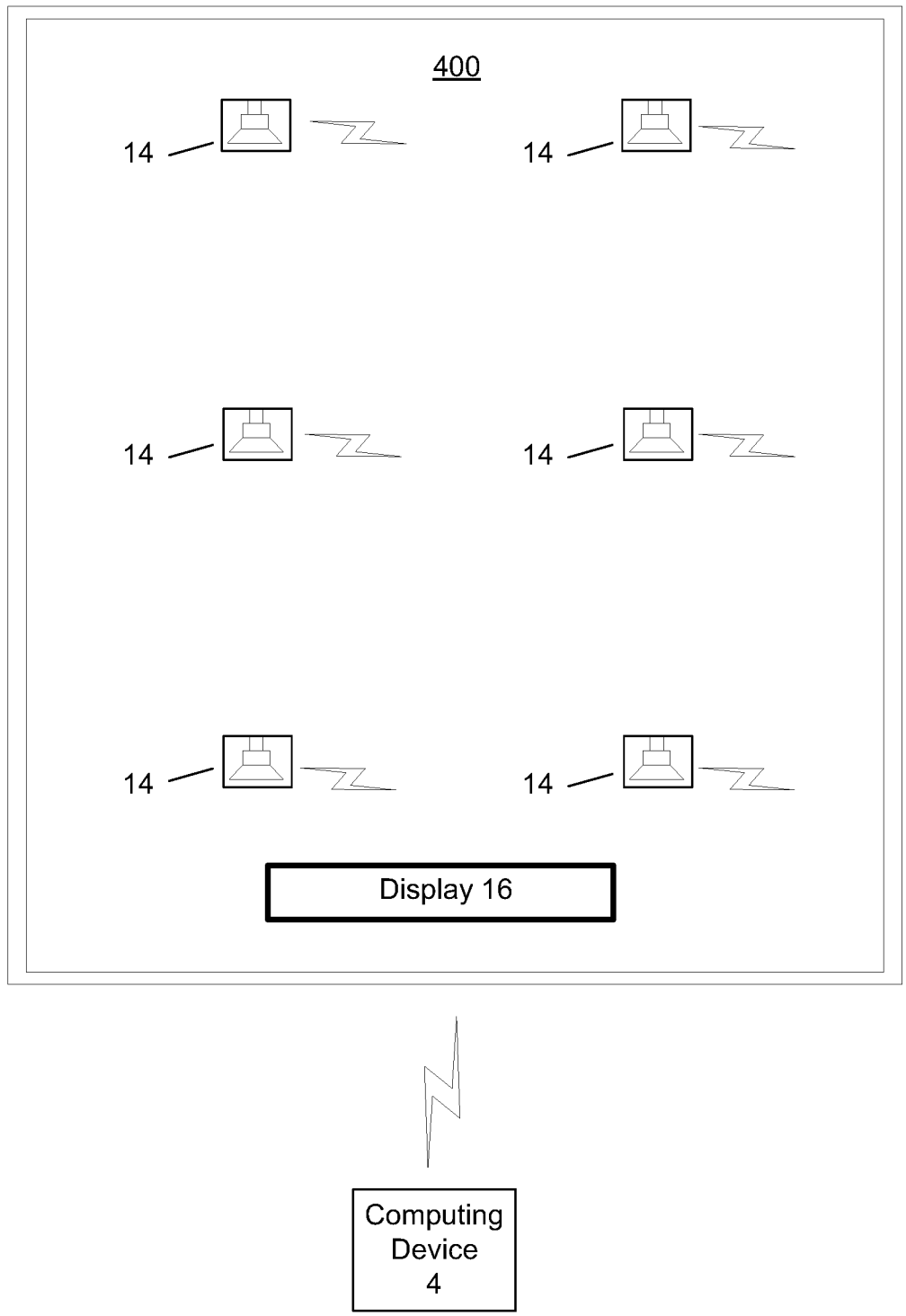
FIG. 4 illustrates a noise masking system in one example.

FIG. 4 illustrates a noise masking system 2 in one example. Noise masking system 2 includes a plurality of loudspeakers 14 and video display 16 under control of a computing device 4. In one example, computing device 4 interfaces with server 20 to receive audio data and video data. Placement of a plurality of the loudspeakers 14 and video display 16 in a space 400 is shown in one example. For example, space 400 may be a large room of an office building. The video display 16 is arranged to be easily visible within the open space. For example, video display 16 is a direct lit led array display, projected image onto a wall mounted screen, or a flat panel LCD.

Computing device 4 performs operations as described herein to output noise masking signals and video signals. Computing device 4 is capable of electronic communications with each loudspeaker 14 and display 16 via either a wired or wireless communications link. For example, computing device 4, loudspeakers 14, and display 16 are connected via one or more communications networks such as a local area network (LAN) or an Internet Protocol network.

In one example, each loudspeaker 14 and display 16 is network addressable and has a unique Internet Protocol address for individual control. Loudspeaker 14 includes a processor operably coupled to a network interface, output transducer, memory, amplifier, and power source. Loudspeaker 14 also includes a near-field wireless interface utilized to link with a control device such as computing device 4. In one example, the network interface is a wireless transceiver and accompanying antenna for communications with a wireless router or access point. For example, the wireless transceiver is a Bluetooth or IEEE 802.11 transceiver. In a further example, the network interface is a wired interface, such as that an Ethernet jack used to connect to computing device 4 over the Internet or a local area network. The processor allows for processing data, including managing noise masking signals over the network interface, and may include a variety of processors (e.g., digital signal processors), with conventional CPUs being applicable. Similarly, display 16 also includes a processor operably coupled to a network interface, wireless interface, output transducer, memory, amplifier, and power source.

In the system illustrated in FIG. 4, sound is output from loudspeakers 14 corresponding to a noise masking signal configured to mask open space noise. In one example, the noise masking signal is a random noise such as pink noise. The sound operates to mask open space noise heard by a person in open space 400. In one example, the masking levels are advantageously dynamically adjusted in response to noise level measurements made in the open space 400. In one example, masking levels are adjusted on a speaker-by-speaker basis in order to address location-specific noise levels.

In one example, the speaker sound is the sound of a flow of water. In one example, the sound corresponding to the flow of water is a recording of a natural flow of water or an electronically synthesized sound of flow of water. In one example, the sound corresponding to a flow of water has been optimized to mask open space noise. For example, a recording of the flow of water has been processed to add 2-4 dB per octave higher frequency boost.

In one example, the loudspeaker 14 is one of a plurality of speakers disposed at varying distances from the video display 16, where an output level of the speaker sound from a speaker is adjusted based on the distance of the loudspeaker 14 from the video display 16. The speaker output level is adjusted so that the sound level of the flowing water (the sound from a speaker at video display 16 combined with the sound of flowing water output from speaker 14) is consistent throughout the open space.

In one example, based on measured noise levels, noise masking system 2 makes changes to the physical environment, including (1) increasing or reducing the volume of the sound masking in order to maintain an optimal masking level, even as speech noise levels change, (2) modifying the masking sound source and/or type—for example, from a sound of birds chirping to a sound of a waterfall, or (3) modifying the masking sound spectrum—for example, from a filtered pink noise to a noise that is closer to brown noise—in response to volume or noise density information, or (4) increasing or decreasing the lighting level, or to changing the color of ambient lighting in open space 400. In one example, noise masking system 2 modifies the visual displayed on video display 16 responsive to a change in the sound environment (i.e., where the sound audio file 10 is changed, the video file 12 is changed).

Figure 5:
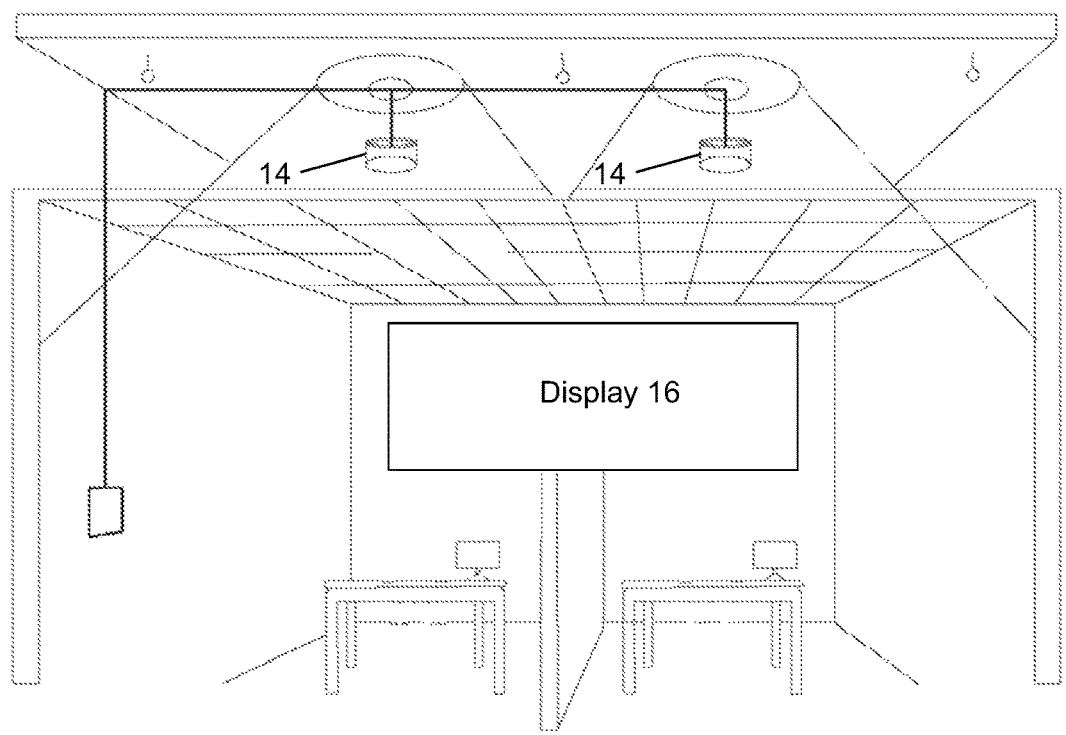
FIG. 5 illustrates placement of the loudspeakers and display device shown in FIG. 4 in one example.

Sound masking systems may be: (1) in-plenum and (2) direct field. FIG. 5 illustrates placement of the loudspeakers 14 and video display 16 shown in FIG. 4 in one example. In-plenum systems involve speakers installed above the ceiling tiles and below the ceiling deck. The speakers are generally oriented upwards, so that the masking sound reflects off of the ceiling deck, becoming diffuse. This makes it more difficult for workers to identify the source of the masking sound and thereby makes the sound less noticeable. In one example, each speaker 14 is one of a plurality of loudspeakers which are disposed in a plenum above the open space and arranged to direct the speaker sound in a direction opposite the open space. In a further example, a direct field system is used, whereby the masking sound travels directly from the speakers to a listener without interacting with any reflecting or transmitting feature.

Figure 6:
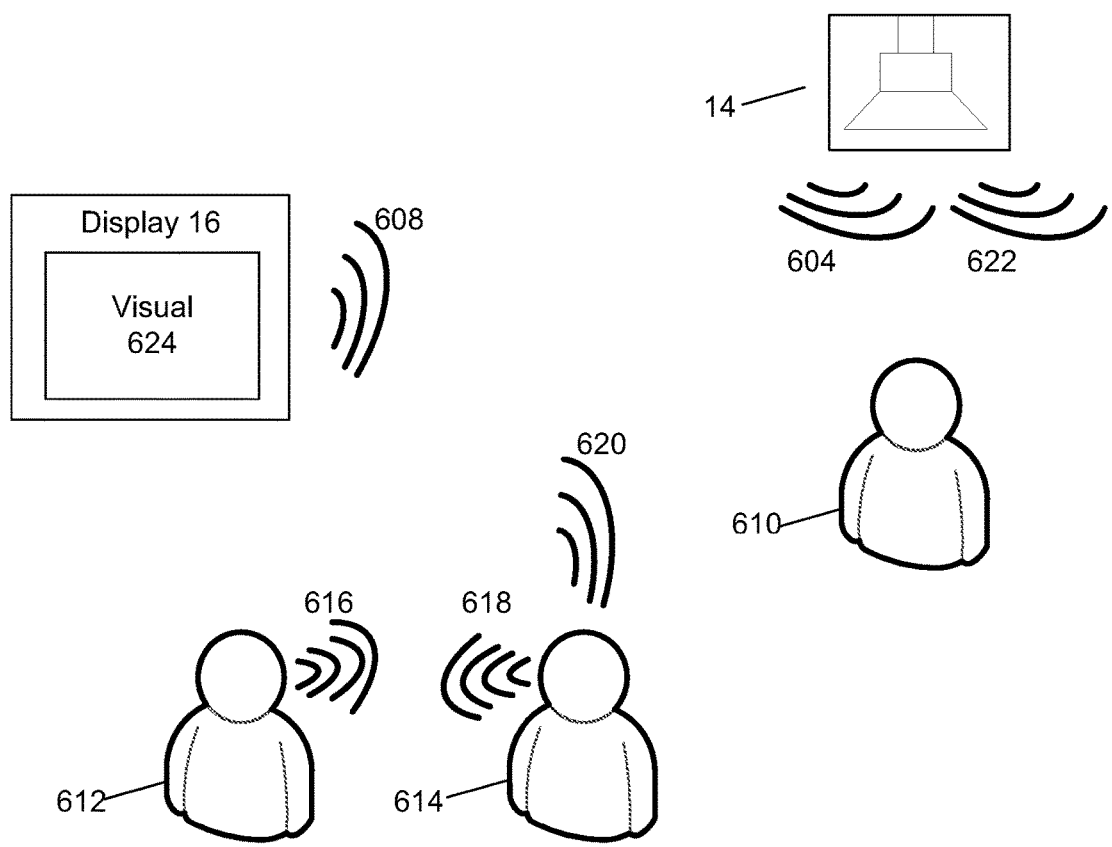
FIG. 6 illustrates a noise masking usage scenario in one example.

FIG. 6 illustrates a usage scenario of the system 2 in one example. A conversation participant 612 is in conversation with a conversation participant 614 in the vicinity of person 610 in an open space. Open space noise 620 includes components of speech 616 from participant 612 and speech 618 from conversation participant 614.

Sound 604 output from speaker 14 operates to mask open space noise 620 heard by a person 610. Sound 604 corresponds to output of a noise masking audio file 10 selected by noise masking application 6 based on the location of system 2. Visual 624 is shown on video display 16. Visual 624 corresponds to output of a video file 12 selected by noise masking application 6 based on the location of system 2. Video display 16 may also include a speaker which outputs sound 608 matching sound 604. Sound 608 from display 16 also operates to mask open space noise 620. The intelligibility of speech 616 and speech 618 is reduced by sound 604 and sound 608.

In one example, sound 604 is a sound of flowing water, such as that of a waterfall or ocean waves. Visual 624 is selected to correspond to sound 604 or be compatible with sound 604. If sound 604 is a sound of flowing water, visual 624 is an image of flowing water, such as that of an image of a waterfall or a beach with ocean waves. The presence of visual 624 shown on video display 16 advantageously increases the user comfort when listening to water sound 604 output from speaker 14 as the person 610 has a frame of reference as to the source of the water sound 604. Playing water sounds alone through the sound masking speaker 14, without a visual water element, causes discomfort among workers, who feel as though the water is dripping down from the ceiling or that it has no logical source. A logical source of the water sound is needed.

In one example, the noise masking audio file 10 played to generate sound 604 is a recording of a natural sound or an electronically synthesized sound. In one example, the sound 604 has been optimized to mask open space noise. For example, a recording of a natural sound has been processed to add 2-4 dB per octave higher frequency boost.

In the system illustrated in FIG. 6, a sound 622 is output from speaker 14 corresponding to a noise configured to mask open space noise in addition to the sound 604. For example, where sound 604 is a water sound, sound 622 may be a random noise such as pink noise. For example, sound 622 is generated from the same or a different noise masking audio file as sound 604. Both sound 604 and sound 622 operate to mask open space noise 620 heard by person 610.

In one example, the speaker sound 604 corresponding to the flow of water is optimized to mask a higher frequency open space noise than the noise sound 622 configured to mask open space noise. For example, a frequency boost of 2-4 dB per octave is added in the processing of the recorded water sound. In this manner, noise sound 622 can be selected to mask lower frequency open space noise. For example, noise sound 622 can be selected to be a pink noise which is more appealing to be heard by persons instead of a white noise, which is slightly more effective in masking higher frequency open space noise but more unpleasant for persons to hear.

In one example, a method for masking open space noise (e.g., noise 620) includes outputting a first masking sound (e.g., sound 622, such as a pink noise) to mask an open space noise (e.g., noise 620) in an open space, and masking an audibility of the first masking sound (e.g., sound 622) utilizing a second masking sound (e.g., sound 604), the second masking sound (e.g., sound 604) also operable to mask the open space noise (e.g., noise 620). This methodology allows the level of the first masking sound (e.g., sound 622) to be increased (i.e., to produce a greater masking effect of noise 620) without being perceived by person 610. This is advantageous where persons prefer to hear the sound of pink noise at a reduced level or not to hear the sound of pink noise. In one example, the output levels of sound 604 and noise sound 622 are determined experimentally and/or based on listener preference. The use of sound 604 and sound 622 produces a greater masking effect than the use of either sound 604 or sound 622 alone, while providing for increased listener comfort.

Figure 10:
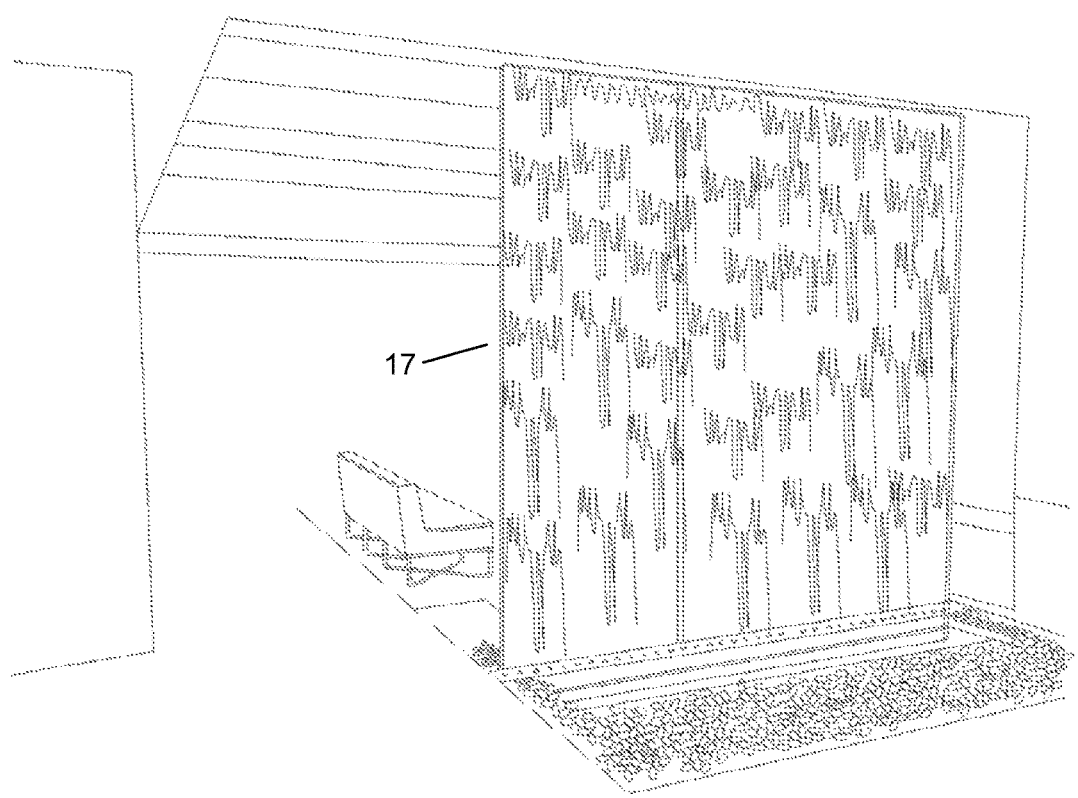
FIG. 10 illustrates a water element system in one example.

In one embodiment, system 2 further includes a water element system 17 (i.e., a physical display of moving water) in the open space in addition to display device 16. The water element system 17 is arranged to be easily visible within the open space. Water sound from water element system 17 also operates to mask open space noise 620. The intelligibility of speech 616 and speech 618 is reduced by the sound from water element system 17. In one example, the water element system 17 is a floor-to-ceiling waterfall including an upper reservoir which receives water from a water supply, and a lower reservoir (e.g., a floor basin) to receive water which has fallen from the upper reservoir. FIG. 10 illustrates the water element system 17 in one example.

The waterfall includes water recirculation tubes for recirculating water from the lower reservoir back to the upper reservoir, and a recirculation pump to recirculate the water through the recirculation tubes up to the upper reservoir. In one implementation, water falls from upper reservoir to the lower reservoir along the surfaces of one or more vertical glass panels disposed between the upper reservoir and the lower reservoir. The flow rate and water volume of the waterfall may be adjusted to control the water sound level.

In one example, the loudspeaker 14 is one of a plurality of speakers disposed at varying distances from the water element system 17, where an output level of the speaker sound from a speaker is adjusted based on the distance of the loudspeaker 14 from the water element system 17. The speaker output level is adjusted so that the sound level of the flowing water (i.e., the sound from the water element system 17 combined with the sound of flowing water output from loudspeaker 14) is consistent throughout the open space. At locations in close proximity to water element system 17, water sound from the water element system 17 is heard. As such, the output level of a loudspeaker 14 in close proximity to water element system 17 is reduced relative to a loudspeaker 14 further away. In one example, the speaker sound has been processed to match the frequency characteristics of the water sound emanating from water element system 17 so that the user is under the impression that the speaker sound is emanating from water element system 17 instead of loudspeaker 14.

In this manner, the water element system 17 may be constructed so that it need not be so loud so as to be heard throughout the open space in order for the water sound to be an effective noise masker. This reduces the possibility that workers in close proximity to the water element system 17 will find the water sound too loud and annoying while allowing workers further away to hear water sound at a sufficient level to provide effective masking of the open space noise.

In various embodiments, the techniques of FIG. 7-9 discussed below may be implemented as sequences of instructions executed by one or more electronic systems. The instructions may be stored by the computing device 4 or the instructions may be received by the computing device 4 (e.g., via a network connection) or stored by the server 20 or the instructions may be received by server 20.

Figure 7:
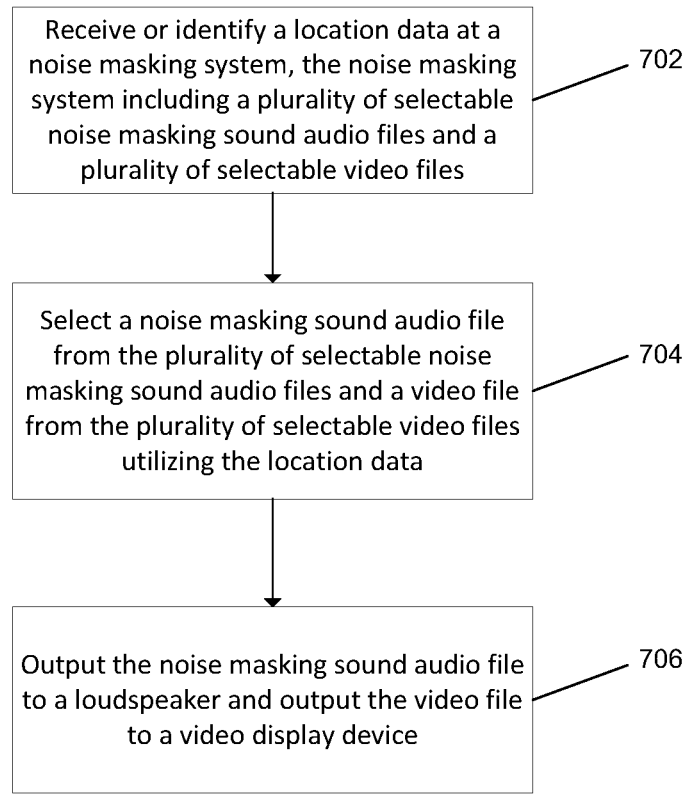
FIG. 7 is a flow diagram illustrating noise masking in one example.

FIG. 7 is a flow diagram illustrating noise masking in one example. At block 702, a location data is received or identified at a noise masking system, the noise masking system including a plurality of selectable noise masking sound audio files and a plurality of selectable video files. In one example, the location data includes an Internet Protocol address. In one example, the location data includes a city, state, or region data.

At block 704, a noise masking sound audio file is selected from the plurality of selectable noise masking sound audio files and a video file is selected from the plurality of selectable video files utilizing the location data. In one example, a current weather condition is identified utilizing the location data, where selecting the noise masking sound audio file from the plurality of selectable noise masking sound audio files and the video file from the plurality of selectable video files includes utilizing the current weather condition. In a further example, a current time of day is identified utilizing the location data, where selecting the noise masking sound audio file from the plurality of selectable noise masking sound audio files and the video file from the plurality of selectable video files includes utilizing the current time. In a further example, a current date is identified, where selecting the noise masking sound audio file from the plurality of selectable noise masking sound audio files and the video file from the plurality of selectable video files includes utilizing the current date.

In one example, the noise masking sound audio file includes a nature associated sound and the video file includes a nature associated visual. For example, (1) the nature associated sound includes a water sound and the nature associated visual includes a water visual, (2) the nature associated sound includes a beach sound and the nature associated visual includes a beach visual, or (3) the nature associated sound includes a forest sound and the nature associated visual includes a forest visual. In one example, the video file selected and the noise masking sound audio file selected are associated (e.g., selecting a particular noise masking sound audio file automatically selects a particular video file and vice versa) at the noise masking system. At block 706, the noise masking sound audio file is output to a loudspeaker and the video file is output to a video display device.

Figure 8:
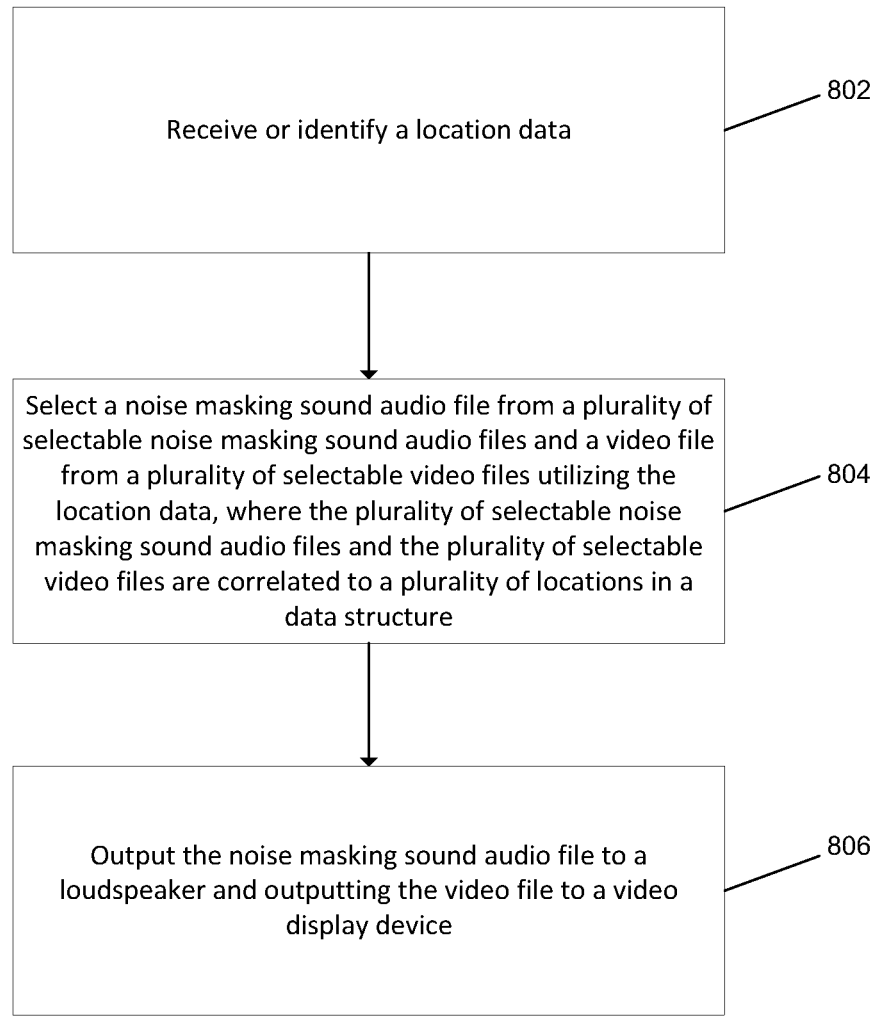
FIG. 8 is a flow diagram illustrating noise masking in one example.

FIG. 8 is a flow diagram illustrating noise masking in one example. At block 802, a location data is received or identified. For example, the location data includes an Internet Protocol address. In a further example, the location data includes a city, state, or region data.

At block 804, a noise masking sound audio file is selected from a plurality of selectable noise masking sound audio files and a video file is selected from a plurality of selectable video files utilizing the location data, where the plurality of selectable noise masking sound audio files and the plurality of selectable video files are correlated to a plurality of locations in a data structure. For example, a table or database stores a list of locations. For each location, one or more noise masking sound audio files and one or more video files are identified as being appropriate for selection for the given location. At block 806, the noise masking sound audio file is output to a loudspeaker and the video file is output to a video display device.

Figure 9:
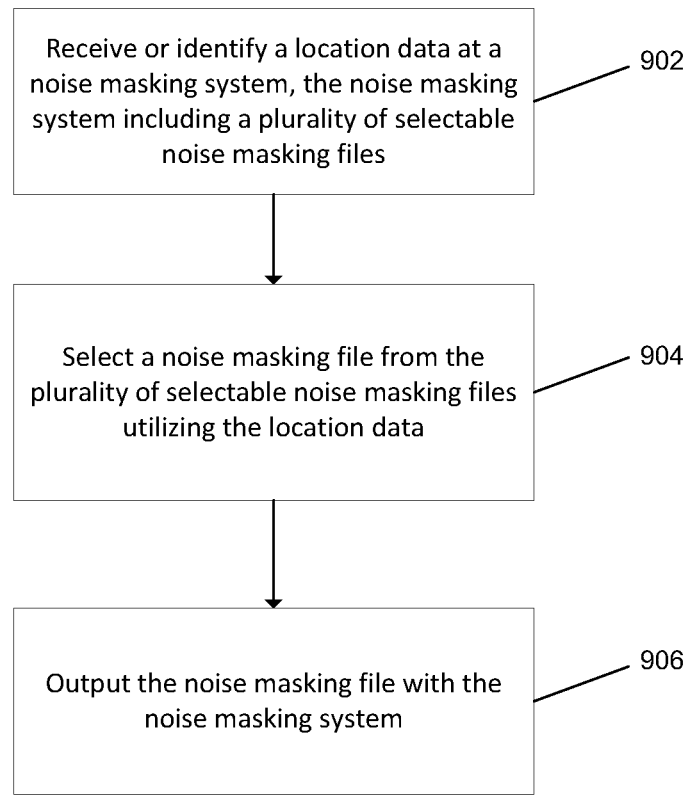
FIG. 9 is a flow diagram illustrating noise masking in one example.

FIG. 9 is a flow diagram illustrating noise masking in one example. At block 902, a location data is received or identified at a noise masking system, the noise masking system including a plurality of selectable noise masking files. At block 904, a noise masking file is selected from the plurality of selectable noise masking files utilizing the location data. In one example, the noise masking file includes an audio data output at a loudspeaker and a video data output at a video display device. At block 906, the noise masking file is output (e.g., played) with the noise masking system.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method comprising:
receiving or identifying a location data utilizing electronic communications at a noise masking system, the noise masking system comprising a plurality of selectable noise masking sound audio files and a plurality of selectable video files;
electronically selecting a noise masking sound audio file from the plurality of selectable noise masking sound audio files and a video file from the plurality of selectable video files utilizing the location data; and
masking a noise in an open space utilizing a localized masking sound comprising outputting the noise masking sound audio file selected utilizing the location data at a loudspeaker and outputting the video file selected utilizing the location data at a video display device.

2. The method of claim 1, wherein the location data comprises an Internet Protocol address.

3. The method of claim 1, wherein the location data comprises a city, state, or region data.

4. The method of claim 1, further comprising identifying a current weather condition utilizing the location data, wherein selecting the noise masking sound audio file from the plurality of selectable noise masking sound audio files and the video file from the plurality of selectable video files comprises utilizing the current weather condition.

5. The method of claim 1, further comprising identifying a current time of day utilizing the location data, wherein selecting the noise masking sound audio file from the plurality of selectable noise masking sound audio files and the video file from the plurality of selectable video files comprises utilizing the current time.

6. The method of claim 1, further comprising identifying a current date, wherein selecting the noise masking sound audio file from the plurality of selectable noise masking sound audio files and the video file from the plurality of selectable video files comprises utilizing the current date.

7. The method of claim 1, wherein the noise masking sound audio file comprises a nature associated sound and the video file comprises a nature associated visual.

8. The method of claim 7, wherein the nature associated sound comprises a water sound and the nature associated visual comprises a water visual.

9. The method of claim 8, further comprising generating a sound of flowing water from a water element system.

10. The method of claim 7, wherein the nature associated sound comprises a beach sound and the nature associated visual comprises a beach visual.

11. The method of claim 7, wherein the nature associated sound comprises a forest sound and the nature associated visual comprises a forest visual.

12. The method of claim 1, wherein the video file selected and the noise masking sound audio file selected are associated at the noise masking system.

13. A system for masking open space noise comprising:
 a speaker arranged to output a speaker sound in an open space;
 a display device disposed in the open space;
 a processor;
 a memory storing:
  a plurality of selectable noise masking sound audio files and a plurality of selectable video files correlated to a plurality of locations; and
  an application program having computer-executable instructions configured to select a noise masking sound audio file from the plurality of selectable noise masking sound audio files and a video file from the plurality of selectable video files utilizing a current location data, and mask a noise in the open space utilizing a localized masking sound by outputting the noise masking sound audio file at the speaker and output the video file at the display device.

14. The system of claim 13, wherein the current location data comprises an Internet Protocol address.

15. The system of claim 13, wherein the current location data comprises a city, state, or region data.

16. The system of claim 13, wherein the display device is arranged to be visible from any location within the open space.

17. The system of claim 13, wherein the speaker is one of a plurality of speakers disposed at varying distances from the display device, wherein an output level of the speaker sound from the speaker is adjusted based on the distance of the speaker from the display device.

18. The system of claim 13, further comprising a water element system.

19. The system of claim 13, further comprising a sensor device outputting a sensor output data, wherein the application program includes instructions to select the noise masking sound audio file from the plurality of selectable noise masking sound audio files and the video file from the plurality of selectable video files utilizing the sensor output data.

20. One or more non-transitory computer-readable storage media having computer-executable instructions stored thereon which, when executed by one or more computers, cause the one more computers to perform operations comprising:
 receiving or identifying a location data utilizing electronic communications;
 electronically selecting a noise masking sound audio file from a plurality of selectable noise masking sound audio files and a video file from a plurality of selectable video files utilizing the location data, wherein the plurality of selectable noise masking sound audio files and the plurality of selectable video files are correlated to a plurality of locations in a data structure; and
 masking a noise in an open space utilizing a localized masking sound comprising outputting the noise masking sound audio file selected utilizing the location data at a loudspeaker and outputting the video file selected utilizing the location data at a video display device.

21. The one or more non-transitory computer-readable storage media of claim 20, wherein the location data comprises an Internet Protocol address.

22. The one or more non-transitory computer-readable storage media of claim 20, wherein the location data comprises a city, state, or region data.

23. The one or more non-transitory computer-readable storage media of claim 20, the operations further comprising identifying a current weather condition utilizing the location data, wherein selecting the noise masking sound audio file from the plurality of selectable noise masking sound audio files and the video file from the plurality of selectable video files comprises utilizing the current weather condition.

24. The one or more non-transitory computer-readable storage media of claim 20, the operations further comprising identifying a current time of day utilizing the location data, wherein selecting the noise masking sound audio file from the plurality of selectable noise masking sound audio files and the video file from the plurality of selectable video files comprises utilizing the current time.

25. The one or more non-transitory computer-readable storage media of claim 20, wherein the noise masking sound audio file comprises a nature associated sound and the video file comprises a nature associated visual.

26. The one or more non-transitory computer-readable storage media of claim 20, wherein the video file selected and the noise masking sound audio file selected are associated with each other.

\* \* \* \* \*